United States Patent [19]
Deffenbaugh et al.

[11] Patent Number: 5,269,994
[45] Date of Patent: Dec. 14, 1993

[54] NONWOVEN BONDING TECHNIQUE

[75] Inventors: Forrest Deffenbaugh, Candler; David B. Christopher, Fletcher, both of N.C.

[73] Assignee: BASF Corporation, Parsippany, N.J.

[21] Appl. No.: 866,700

[22] Filed: Apr. 10, 1992

[51] Int. Cl.$^5$ .................... B29C 59/00; B32B 31/00; D04H 1/54

[52] U.S. Cl. .................... 264/119; 264/122; 156/62.6; 156/269; 28/122

[58] Field of Search .............. 28/115, 122; 264/122, 264/119, 345; 428/288; 156/62.6, 296, 220

[56] References Cited

U.S. PATENT DOCUMENTS

| | | |
|---|---|---|
| 2,277,049 | 3/1942 | Reed. |
| 2,464,301 | 3/1949 | Francis, Jr. ............ 156/220 X |
| 2,712,171 | 7/1955 | Hoffman ............ 28/122 X |
| 3,364,543 | 1/1968 | Homier et al. ............ 28/122 X |
| 4,476,078 | 10/1984 | Tao ............ 264/119 |
| 4,753,693 | 6/1988 | Street ............ 156/296 X |
| 4,906,521 | 3/1990 | Turunen et al. ............ 428/288 |
| 4,978,489 | 12/1990 | Radvan et al. ............ 156/296 X |
| 5,006,183 | 4/1991 | Fleissner ............ 156/626 X |
| 5,077,874 | 1/1992 | Trask et al. ............ 28/115 |
| 5,093,051 | 3/1992 | Reiniger ............ 264/122 X |
| 5,194,106 | 3/1993 | Geary, Jr. et al. ............ 156/296 X |

Primary Examiner—Clifford D. Crowder
Assistant Examiner—John J. Calvert

[57] ABSTRACT

Thermally bonding nonwoven fabrics having superior tensile stength without decreased absorbency are prepared by supplying a web to a hot calender bonding system and passing the resulting calendered web to a hot-air bonding system.

9 Claims, 3 Drawing Sheets

NONWOVEN BONDING TECHNIQUE

FIELD OF THE INVENTION

The present invention relates generally to nonwoven fabrics and more particularly to a method for thermally bonding nonwoven fabrics.

BACKGROUND OF THE INVENTION

Many nonwoven fabrics are interfilamentarily bonded to impart integrity to the fabric. While there are several bonding techniques available, thermal bonding processes prevail in the nonwovens industry both in volume and time devoted to the research and development of new products. These processes have gained wide acceptance due to simplicity and many advantages over traditional chemical bonding methods. Attractive features include low energy and raw material costs, increased production rates, and product versatility. Chemical simplification, since binders are not used, reduces concerns over the environment.

Thermal bonding processes involve the incorporation of a heat sensitive material into a web using traditional web forming techniques. Heated rolls in calender bonding or hot air in hot air bonding bring the web to a temperature at or near the melting point of this material. The molten mass flows and a glue-like bond forms to provide strength to the nonwoven. The bonding agent in many cases is a fusible fiber blended with a matrix fiber or used alone in the base web.

U.S. Pat. No. 2,277,049 to Reed introduced the idea of using fusible fibers to make nonwoven fabrics. He proposed blending fusible and nonfusible fibers of similar denier and cut length and treating the web with either solvent or heat. The fusible fibers become tacky and act as a binder. A nonwoven fabric results after pressing and cooling the tacky web.

A goal in manufacturing nonwoven fabrics is to make them both absorbent and strong. To accomplish this goal, blends of materials are used. Commonly, rayon or other cellulosics are used for absorbency and polypropylene or other polyolefins are used for strength. In cellulosic/polyolefin blend nonwovens, as the percentage of polyolefin increases, the absorbency decreases. Vice versa, as the percentage of cellulosic increases, the fabric strength decreases. There is, therefore, an inherent dilemma in manufacturing nonwovens which are both absorbent and strong.

One solution to the dilemma is spun-laced fabrics. Spun-laced fabrics are made by mechanical entanglement of filaments with water jets. The resulting fabric is strong and absorbent, but very expensive.

Strong and absorbent nonwovens may be prepared using latex resin as a bonding agent. The use of latex raises the specter of environmental problems. Also, the latex must be dried at additional expense and complication to the process.

SUMMARY OF THE INVENTION

The present invention addresses the shortcomings in the art with a process for thermally bonding nonwoven fabrics comprising supplying a carded web to a hot calender bonding system followed by passing the resulting calendered web to a hot-air bonding system.

It is an object of the present invention to provide an improved process for preparing thermally bonded nonwoven fabrics.

It is a further object of the present invention to provide an improved nonwoven fabric.

After reading the following description, related objects and advantages of the present invention will be apparent to those ordinarily skilled in the art to which the invention pertains.

DETAILED DESCRIPTION OF THE PREFERRED EMBODIMENTS

To promote an understanding of the principles of the present invention, descriptions of specific embodiments of the invention follow and specific language describes the same. It will nevertheless be understood that no limitation of the scope of the invention is thereby intended, and that such alterations and further modifications, and such further applications of the principles of the invention as discussed are contemplated as would normally occur to one ordinarily skilled in the art to which the invention pertains.

The present invention concerns a process for thermally bonding nonwoven fabrics. A two-stage process is used. In the first stage, a nonwoven web is supplied to a calender bonding system. In the second stage, the calender bonded web is provided to a hot-air bonding system. Surprisingly, this process produces a nonwoven fabric having superior strength characteristics without adversely affecting absorbency.

While it is contemplated that the present invention is useful with a wide variety of webs made from a wide variety of materials. Preferably, two component webs are used. One component is preferably a cellulosic, most preferably rayon. The other component is a binder fiber such as a polyolefin or a bicomponent fiber having a relatively low melting component, most preferably polypropylene or polypropylene/polyester sheath/core bicomponent fiber. When subjected to heat at or near the melting point of the binding component of the binder fiber, the binding component (such as polypropylene) forms a molten flow which, after congealing, integrates the cellulosic material.

The webs subjected to the process of the present invention may be formed from staple or continuous filament according to known or developed methods. For example, when staple fibers are used, the web may be formed by carding or air laying methods. The cellulosic preferably makes up from 10 to 90% by weight of the web. More preferably, the cellulosic makes up from 25 to 75% by weight to achieve optimum absorbency. The balance is primarily the binder fiber.

After forming the web, it is subjected to the process of the present invention. Steps for carrying out the invention are described below in connection with the figures.

Figure 1:
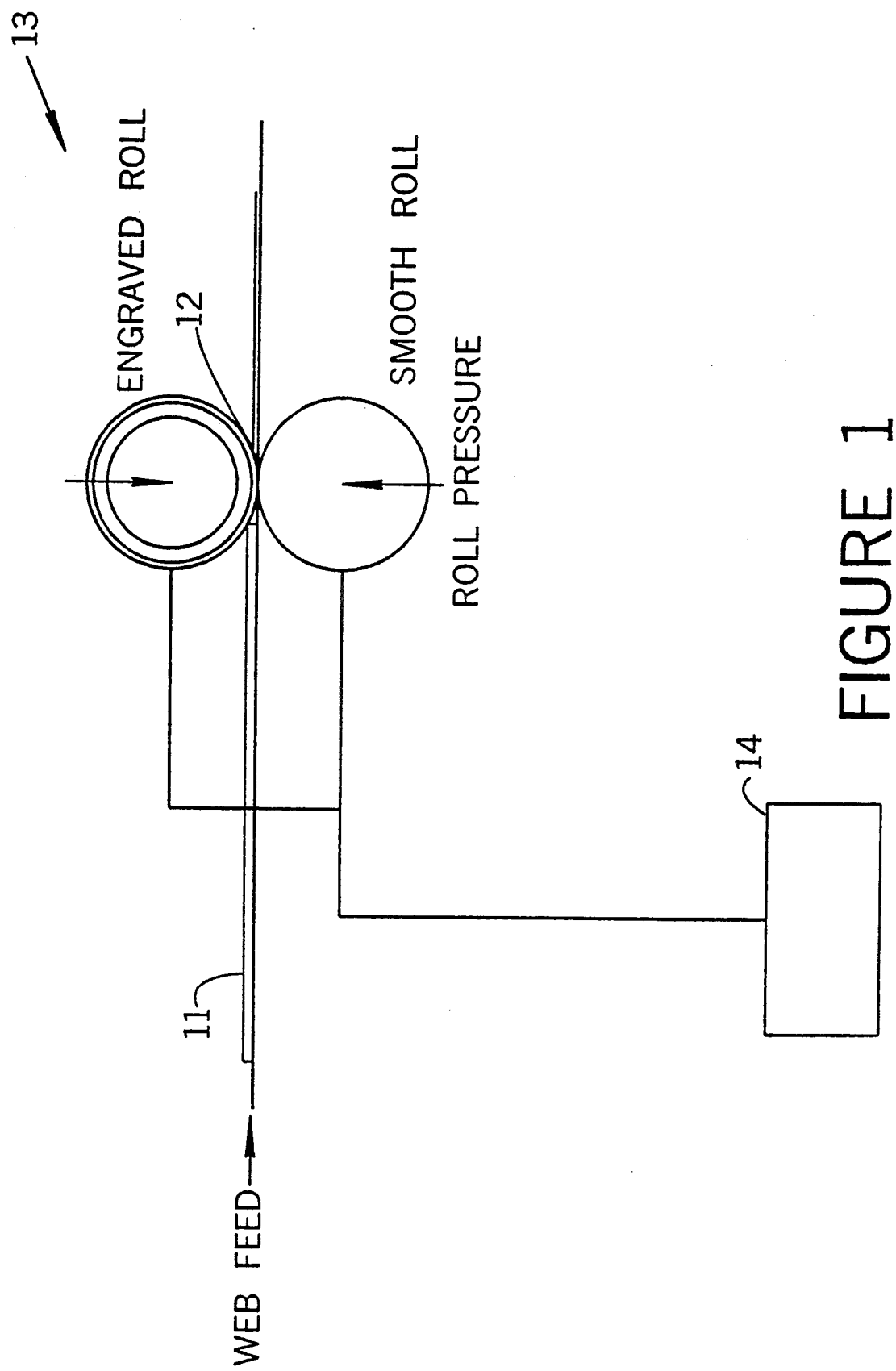
FIG. 1 is a schematic diagram of calendering process useful in the present invention.

FIG. 1 shows web 11 entering the nip region 12 between two rolls of a calender bonder 13. Circulating oil, steam, gas, or electricity heat the rolls through wide bores machined in their interior (not shown). Thermal energy is supplied to the heating medium via roll heat unit 14. Two roll systems or several stacked rolls for bonding may be used. Rolls may be smooth or embossed, or a combination of the two, as in moire' calendering. Smooth rolls allow bonding of the entire fabric surface, producing a light weight, stiff fabric. In general, fabric stiffness and flexural strength increase with bonding temperature, pressure and content of binder fiber.

The surface geometry of the embossed roll influences the degree of bonding and in turn the fabric properties. Only the area under the roll pattern bonds from the heat and pressure of the rolls. Small points, such as the tips of pyramids can produce soft, moderately strong fabrics. Grids, on the other hand, give much stronger fabrics but a paper like fabric hand. Rolls for calender bonders range in size from about 150 mm to about 500 mm in diameter, with speeds from about 5 to about 150 m/min. Temperatures up to about 250° with deviations of 2° C. are obtainable. Nip pressures in the gap can exceed 5000 pounds/linear inch (pli) through the use of hydraulic systems. Commercial manufactures of calender bonders useful in the present invention include Beloit-Wheeler, Perkins, Verduin, Kusters, and Kleinewefers. The temperature of the roll should be sufficient to melt the binder component at the point of contact, thereby forming a spot weld of the fabric. This temperature is at least 140° C. in the case of polypropylene and at least 110° C. in the case of polyethylene. In addition, as will be readily recognized by those ordinarily skilled in the relevant art, the tension, speed, web thickness, fiber denier, etc., will affect the performance of the fabric and these variables may be adjusted to achieve optimum results.

Figure 2:
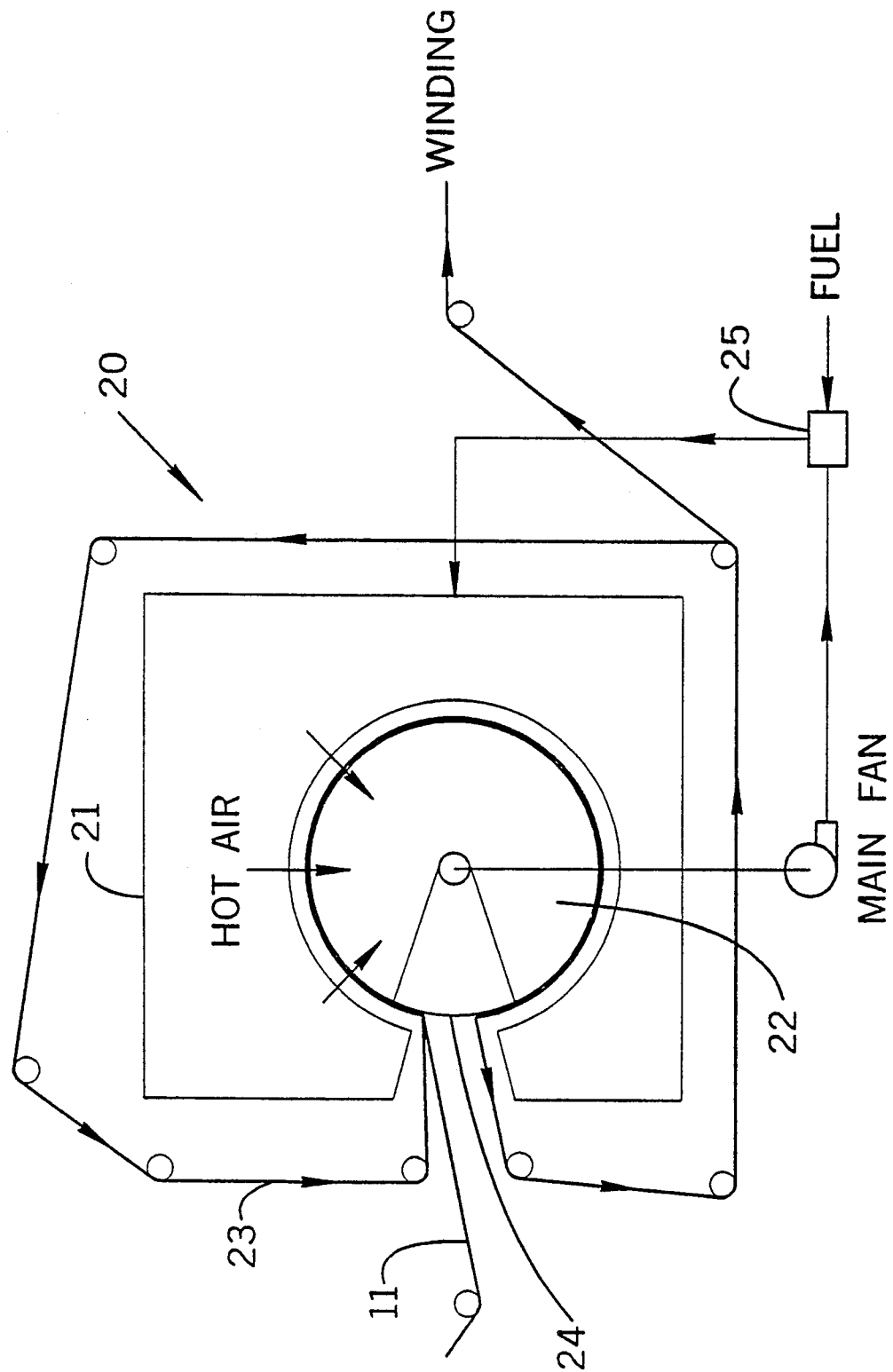
FIG. 2 is a schematic diagram of a hot air bonding process useful in the present invention.

FIG. 2 is a schematic of a hot air bonder useful in the present invention. In general, equipment for hot-air bonding can be divided into two types: conveyor systems, where hot air is forced upon the surface of a web traveling down a conveyor system; and through hot-air ovens, such as suction drum ovens, where hot air is actually sucked through the web for bonding. However, any known or developed hot-air process may be used.

For illustration of a hot-air method only, a suction drum oven is shown in FIG. 2. Bonding occurs as oven 20 vacuums hot air through nonwoven web 11 from hood 21 positioned over perforated drum 22. A carded web enters the oven supported on a wire or a conveyor or a wire covering surface of drum 24. The drum surface is of perforated plate, screen, or honeycomb geometry. A second restraining wire 23 sandwiches the web to the drum and provides consolidation, patterning, and controls shrinkage. For precise temperature control, process air is supplied by heater 25. Increases in air velocity generally increase fabric strength. Temperature variations as little as 1° C. across the web are achievable. Once again, the air temperature should be sufficient to melt the binder component causing it to flow. This temperature is about 140° C. in the case of polypropylene and at least 110° C. in the case of polyethylene.

Through-hot-air bonders are capable of processing webs from 15 to 600 grams/square meter at speeds up to 600 feet/min. Air velocities to 300 feet/min are obtainable. Manufacturers include Fleissner, Honeycomb, Aztec, Proctor, and National.

Figure 3:
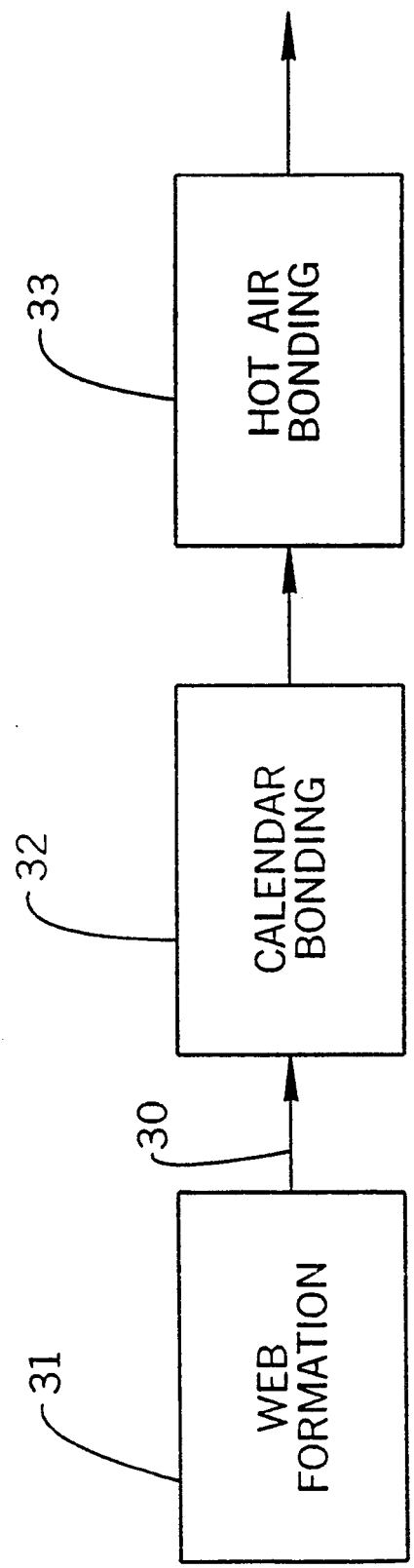
FIG. 3 is a schematic of the composite process of the present invention.

FIG. 3 is a schematic of the process of the present invention showing integration of the process steps. First, web 30 is formed in web formation step 31, the web 30 is calender bonded 32 followed by hot-air bonding 33. Following hot-air bonding 33, the web may be wound up and after treated according to any known or developed method relevant to the desired end use of the web.

The invention will be described by reference to the following detailed examples. The Examples are set forth by way of illustration, and are not intended to limit the scope of the invention. In the examples, all parts are part by weight unless otherwise specified.

EXAMPLE

I. Web Formation

A. Web A: A blend of 25% 2 dpf, 1.5 inch polypropylene staple fiber and 75% 1.5 dpf, 1 9/16 inch rayon staple fiber is made and conveyed to a card. A web having a basis weight of approximately 1 oz/yd$^2$ is produced.

B. Web B: A web is formed like Web A except 3 dpf, 1.5 inch polypropylene/polyester sheath/core bicomponent fiber is substituted for the polypropylene fiber.

C. Web C: A web is formed like Web A except 3 dpf, 1.5 inch polyethylene/polyester sheath/core bicomponent fiber is substituted for the polypropylene fiber.

D. Web D: A web is formed like Web B but is subjected to different bonding conditions as described below.

E. Web E: A web is formed like Web A but is subjected to different bonding conditions as described below.

II. Bonding Process

A. Web A 1. condition 1: Web A is conveyed at 7 ft/min to a calender bonder having one textured roll and one smooth roll. The textured roll is operated at 140° C. The nip pressure is 38 KPa/cm. The calendered web is then rolled up. The tensile strength and elongation in both the machine direction (MD) and cross machine direction (XMD) and the absorbency of the web are measured. All measurements are made according to ASTM standard nonwoven testing procedures. The results are reported in TABLE 1 under Condition 1.

2. Condition 2: Following condition 1, the web is turned over and conveyed to the calender bonder as in Condition 1. The results are reported in TABLE 1 under Condition 2.

3. Condition 3 (Hot-air bonding step): The calendered Web A from Condition 1 is unrolled on the conveyor of a hot-air bonding system (AZTEC conveyor hot-air bonding system). The air temperature is 140° C. Following hot-air bonding, the web is rolled up. Tensile strength and elongation in both MD and XMD and the absorbency of the web are measured according to ASTM standard nonwoven testing procedures. The results are reported in TABLE 1 as Condition 3.

4. Condition 4: Fabric from condition 2 is unrolled and passed through a hot-air bonder according to condition 3. The results are reported in TABLE 1 as Condition 4.

B. Web B

The bonding process is identical to that for Web A but all results are reported in TABLE 2.

C. Web C

The bonding process for Web A is followed except that both bonding rolls are smooth. The hot-air temperature is 110°-115° C. and a nip pressure of 25 kPa/cm. All results are reported in TABLE 3.

D. Web D

The bonding process for Web A is followed except that both bonding rolls are smooth and the results are reported in TABLE 4.

E. Web E

The bonding process for Web A is followed except that both bonding rolls are smooth and the results are reported in TABLE 5.

III. Results

The data demonstrates the strength superiority of fabric prepared according to the present invention (Condition 3). Yet, while the Condition 3 fabrics have increased strength, the absorbency is not adversely affected.

TABLE 1

| | WEB A | | | |
|---|---|---|---|---|
| | Condition | | | |
| | 1 | 2 | 3 | 4 |
| MD | | | | |
| Tensile strength (gms) | 207 | 220 | 385 | 340 |
| Elongation (%) | 17 | 12 | 18 | 10 |
| XMD | | | | |
| Tensile strength (gms) | 32 | 31 | 73 | 86 |
| Elongation (%) | 28 | 14 | 24 | 14 |
| Absorbency (gms/gms water) | 15 | 12 | 13 | 11 |

TABLE 2

| | WEB B | | | |
|---|---|---|---|---|
| | Condition | | | |
| | 1 | 2 | 3 | 4 |
| MD | | | | |
| Tensile strength (gms) | 59 | 89 | 227 | 315 |
| Elongation (%) | 9 | 9 | 12 | 11 |
| XMD | | | | |
| Tensile strength (gms) | 10 | 17 | 42 | 62 |
| Elongation (%) | 20 | 17 | 24 | 17 |
| Absorbency (gms/gms water) | 14 | 12 | 14 | 13 |

TABLE 3

| | WEB C | | | |
|---|---|---|---|---|
| | Condition | | | |
| | 1 | 2 | 3 | 4 |
| MD | | | | |
| Tensile strength (gms) | 91 | 124 | 273 | 279 |
| Elongation (%) | 5 | 6 | 9 | 11 |
| XMD | | | | |
| Tensile strength (gms) | 6 | 6 | 23 | 53 |
| Elongation (%) | 9 | 9 | 22 | 13 |
| Absorbency (gms/gms water) | 14 | 11 | 9 | 9 |

TABLE 4

| | WEB D | | | |
|---|---|---|---|---|
| | Condition | | | |
| | 1 | 2 | 3 | 4 |
| MD | | | | |
| Tensile strength (gms) | 47 | 218 | 554 | 601 |
| Elongation (%) | 6 | 4 | 10 | 10 |
| XMD | | | | |
| Tensile strength (gms) | 5 | 23 | 59 | 50 |
| Elongation (%) | 11 | 6 | 27 | 23 |
| Absorbency (gms/gms water) | 15 | 13 | 12 | 11 |

TABLE 5

| | WEB E | | | |
|---|---|---|---|---|
| | Condition | | | |
| | 1 | 2 | 3 | 4 |
| MD | | | | |
| Tensile strength (gms) | 41 | 71 | 329 | 347 |
| Elongation (%) | 6 | 5 | 16 | 16 |
| XMD | | | | |
| Tensile strength (gms) | 4 | 10 | 42 | 47 |
| Elongation (%) | 13 | 9 | 56 | 45 |
| Absorbency (gms/gms water) | 12 | 11 | 14 | 14 |

What is claimed is:

1. A process for thermally bonding nonwoven fabrics constructed of a first component and binder component and having superior tensile strength without decreased absorbency comprising:
   a) supplying a web to a hot calender bonding system;
   b) calendering the supplied web in the hot calender bonding system such that a portion of the binder component melts and adheres to a portion of the first component;
   c) passing the resulting calendered web to a hot-air bonding system; and
   d) heating the passed calendered web with hot air supplied in the hot-air system sufficiently for the binder component to flow.

2. The process of claim 1 wherein said supplying is of a two component web containing a cellulosic fiber and a binder fiber.

3. The process of claim 2 wherein the cellulosic fiber is rayon.

4. The process of claim 3 wherein the binder fiber is selected from the group consisting of:
   polyolefins; and
   bicomponents containing polyolefins.

5. The process of claim 4 wherein the polyolefin is selected from the group consisting of:
   polypropylene, and
   polyethylene.

6. A process of claim 4 wherein said calendering is done with rolls heated to at least 110° C. in the case of polyethylene and at least 140° C. in the case of polypropylene.

7. A process for thermally bonding nonwoven fabrics comprising:
   (a) supplying a web composed of rayon fibers and binder fibers to a hot calender bonding system, having at least two calender bonding rolls heated to a temperature sufficient to melt at least a portion of the binder fibers causing the portion to flow and incorporate rayon fibers;
   (b) calendering the supplied web in the hot calender bonding system;
   (c) passing the resulting calendered web to a hot-air bonding system and bonding the web with air heated to a temperature sufficient to melt at least a portion of the binder fibers causing the portion to further flow and incorporate rayon fibers.

8. The process of claim 7 wherein the binder fiber is selected from the group consisting of:
   polyolefins; and
   bicomponents containing polyolefins.

9. The process of claim 8 wherein the polyolefin is selected from the group consisting of:
   polypropylene, and
   polyethylene.

* * * * *